Oct. 16, 1951  R. A. NICHOLSON  2,571,283
AUTOMATIC BEVERAGE DISPENSING APPARATUS
Filed July 1, 1946  6 Sheets-Sheet 3

Inventor:
Ralph A. Nicholson
By
Attorney

Inventor:
Ralph A. Nicholson

Oct. 16, 1951  R. A. NICHOLSON  2,571,283
AUTOMATIC BEVERAGE DISPENSING APPARATUS
Filed July 1, 1946  6 Sheets—Sheet 6

FIG.11.

Inventor:
Ralph A. Nicholson
By
Attorney

Patented Oct. 16, 1951

2,571,283

UNITED STATES PATENT OFFICE 2,571,283

AUTOMATIC BEVERAGE DISPENSING APPARATUS

Ralph A. Nicholson, Chicago, Ill., assignor, by mesne assignments, to Lyon Industries, Inc., New York, N. Y., a corporation of Delaware Application July 1, 1946, Serial No. 680,621

12 Claims. (Cl. 225—21)

This invention pertains to dispensing apparatus, particularly beverage dispensers of the automatic and coin-controlled variety.

The principal objects of the invention are: the provision of novel cup dispensing means, including a cup magazine adapted to store a greater quantity of cups in less space and with greater economy of space, than required by prior cup dispensing means;

The provision of beverage dispensing means, cup dispensing means, and cup positioning means coacting with a common driving motor and control means, and optionally coin-controlled, for discharging and positioning a cup relative to beverage measuring and flow means, advancing the filled cup to the position of access to the customer, normalizing the mechanism, and, in the case of the coin-controlled machine, removing the operating coin from the coin control;

The provision of a magazine cup dispenser including a plurality of upright cup magazines each containing vertically stacked cups, and each attached to an endless conveyor means moving cyclically in an approximately oblate path so that said magazines can be moved successively into and away from register with a cup ejector, and automatic, cup-controlled means for causing the conveyor to move and position a filled magazine in register when the preceding one becomes empty.

Still further objects ralate to the provision of cup-positioning means including a reciprocable arm, and cup-engaging formation thereon, which is disposed to block access to the cup ejector when in normal or idle position for the purpose of discouraging theft and vandalism, and which retracts to permit a cup to fall into position to be seized by the engaging formation upon subsequent advancing movement of said arm, by reason of which movement the cup is advanced beneath a beverage dispensing spigot for filling, and thereafter further advanced to delivery position; to the provision of mechanism for actuating the aforesaid cup-positioning means in timed relation to the operation of cup-ejecting and beverage-dispensing means; to the provision, in combination with a known type of cup ejector which is adapted to be actuated by a rotating shaft, of drive mechanism operating cyclically from such a shaft for additionally actuating a beverage-measuring and dispensing means, the aforesaid cup-positioning means, coin control means, and master control means, all in timed relation, and with minimized number of simple operating parts which are easily serviced and maintained.

Additional objects and aspects of novelty in the invention relate to details of construction and operation of the parts of the illustrative embodiment hereinafter described in view of the annexed drawings in which.

Figure 1:
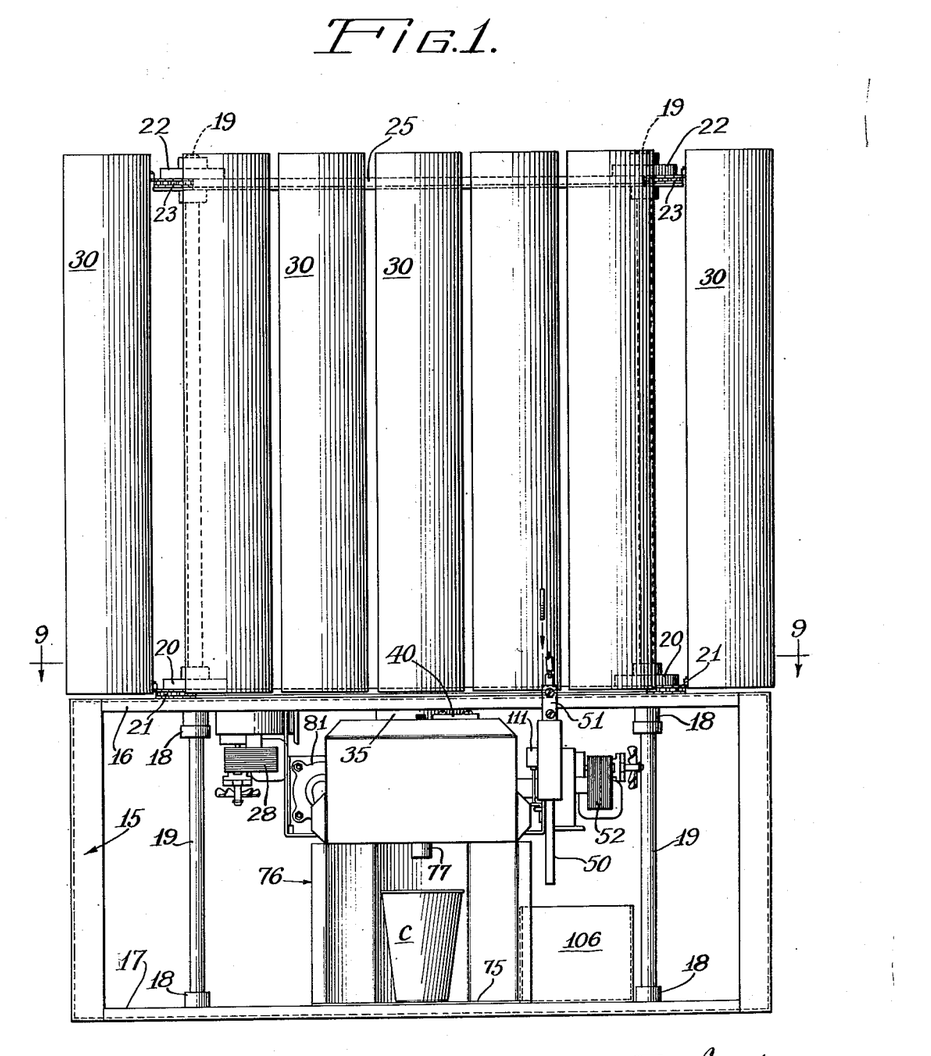
Fig. 1 is a front elevation of the novel dispensing apparatus.

In Fig. 1 is shown a front elevation of a cup and beverage dispensing apparatus arranged as a unitary construction, which is adapted to be housed in a suitable cabinet, along with additional apparatus necessary to the automatic dispensing of cooled drinks in considerable volume, such as refrigerating means, a supply of carbonated water and flavoring syrup, and the like, all of the latter additional apparatus, as well as a cabinet, being omitted from these views for simplicity.

The unit of Fig. 1 consists of a rectangular frame 15 having top and bottom plates 16 and 17 in which are aligned pairs of bushings 18 journaling a pair of upright conveyor shafts 19, which project upwardly through the top plate a considerable distance.

Figure 2:
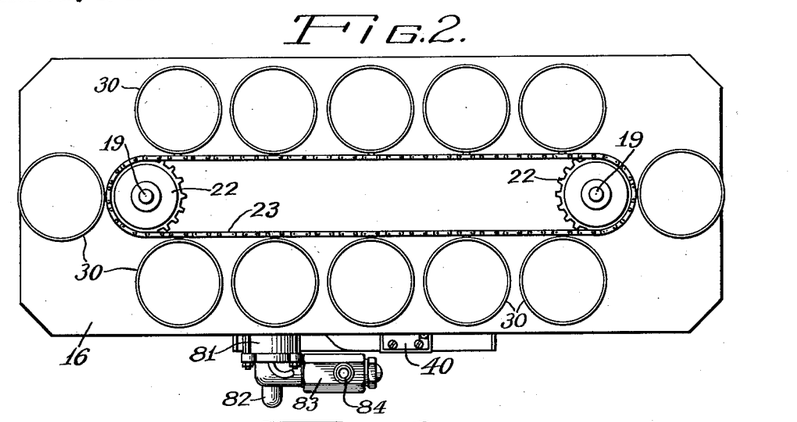
Fig. 2 is a top plan view of the same.

Fixed to each shaft 19 at the upper surface of the top plate is a chain sprocket 20 having a continuous sprocket chain 21 trained thereover; similar sprockets 22 and chain 23 are arranged near the upper extremities of said shafts. These constructions are shown additionally in the sectional view, Fig. 9, showing the bottom sprockets and chain, and in the top plan view of the top or upper sprockets and chain of Fig. 2.

Figure 9:
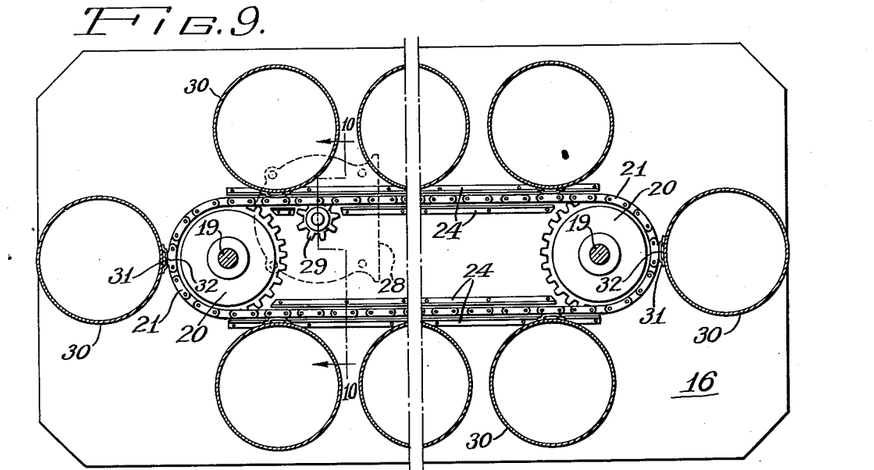
Fig. 9 is a horizontal section through the cup magazine structure; this section is taken along lines 9—9 of Fig. 1.
Figure 10:
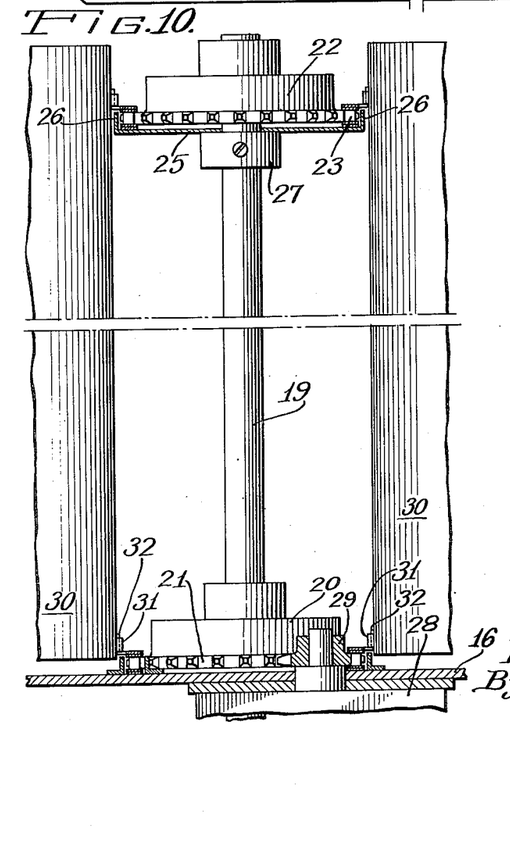
Fig. 10 is a vertical sectional detail through the cup magazine conveyor means, to enlarged scale, and taken along lines 10—10 of Fig. 9.

As in Fig. 9, pairs of angle brackets 24 are secured in parallelism to the upper face of the top plate to guide the lower chain 21 in its substantially oblate path of travel, said brackets being shown in section to larger scale in Fig. 10, in which view also appears an elongated, oblate, upper chain guide plate 25 with upset guide edges 26, said plate being supported in elevated condition by sleeves 27 therebeneath on each shaft 19.

Means for driving the conveyor chains includes a small motor 28 (Figs. 1, 3, 9, 10) mounted on the under side of the top plate 16 with its shaft projecting upwardly through the latter to drive a small sprocket gear 29, Fig. 10, meshing with the links of the lower chain and serving to drive the latter at a slow rate, the motor 28 being of the variety having a self-contained reducing gear.

A plurality of cup magazines of cylindrical shape, indicated at 30, Fig. 1, are attached near their respective upper and lower extremities to the upper and lower conveyor chains so as to move with the latter in upright position, these magazines being removable by reason of the attaching means shown in Figs. 9 and 10, which means includes small U-shaped stirrups straps 31 fixed on the cylinders and each engaging a small angle finger 32 fixed on a chain link; the yieldability of the link chain permits sufficient movement of the cylinders to disengage the stirrups from the fingers for removal of any magazine cylinder.

Figure 3:
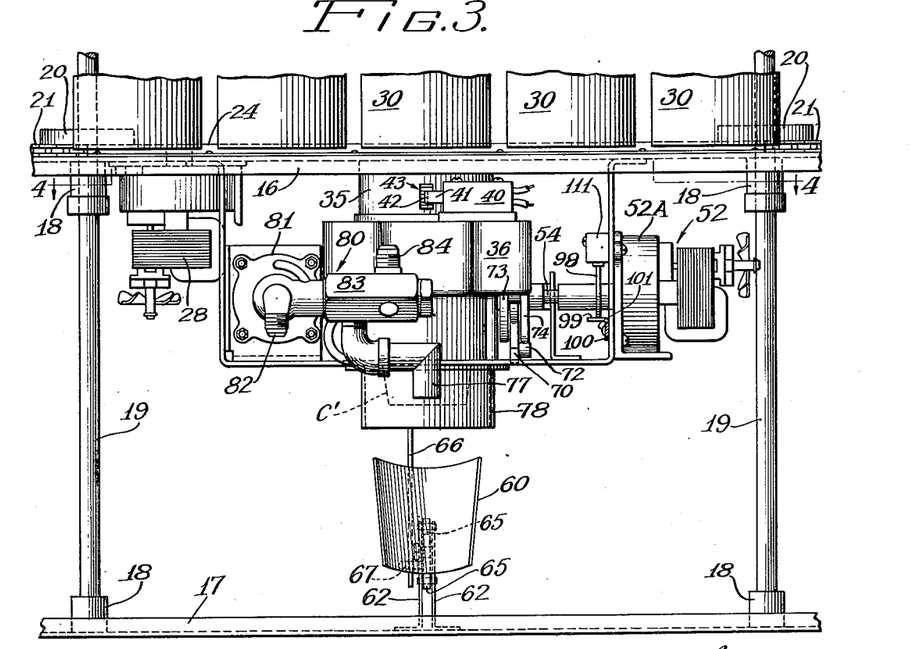
Fig. 3 is an elevational view of the lower part of the machine shown in Fig. 1, to enlarged scale, and having the cup shield removed to show the beverage dispensing means and cup ejecting means.
Figure 4:
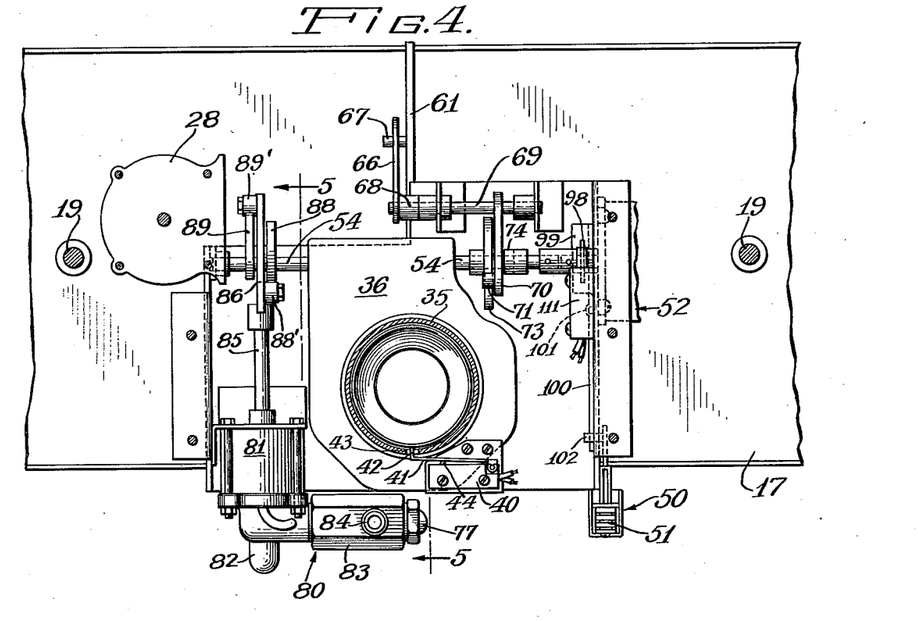
Fig. 4 is a horizontal section along lines 4—4 of Fig. 3, showing parts of the master drive mechanism in full line or plan.
Figure 6:
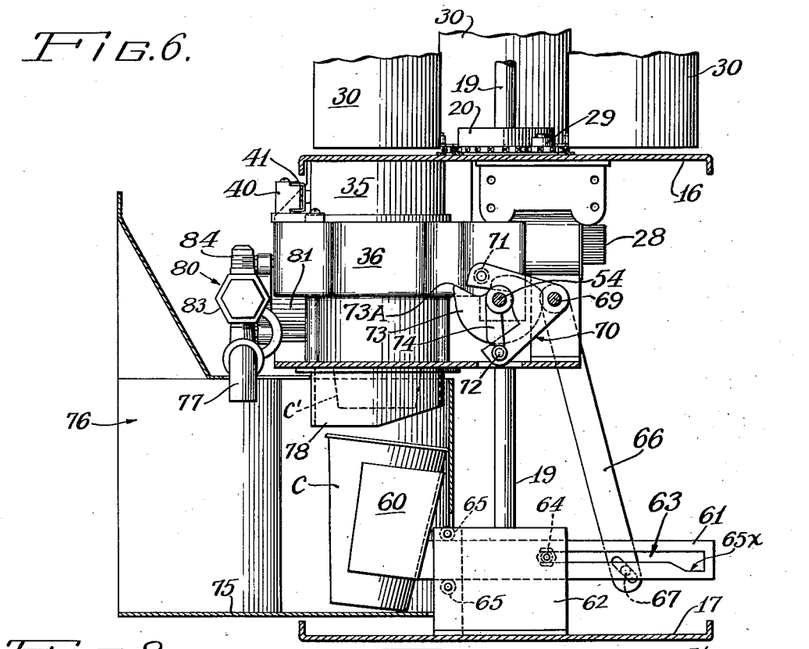
Fig. 6 is a vertical sectional fragment, to enlarged scale, through the lower part of the dispensing machine, showing the cup-ejector, cup-positioning arm, and dispensing spigot in elevation, with ejected cup ready for advance by said positioning arm.

The bottoms of the several magazines are open, the stacks of cups being retained therein by the top frame plate 16, excepting at one point along the path of travel of the magazines, at which point there is a cup opening (not seen) in register with the cylindrical throat 35, Figs. 3, 4, 6, of a known type of cup feeder or ejector 36, adapted to release one cup at a time from the bottom of a stack feeding by gravity into the throat 35.

The cup ejector 36 does not constituted per se part of the invention, and it is therefore not shown in detail; however, the extent to which it cooperates in the novel arrangement herein disclosed requires statement that the ejecting mechanism thereof is actuated from a rotating shaft, to be described in detail hereinafter, a complete shaft rotation causing one cup to be released to gravitate from the ejecting unit or means 36.

Figure 7:
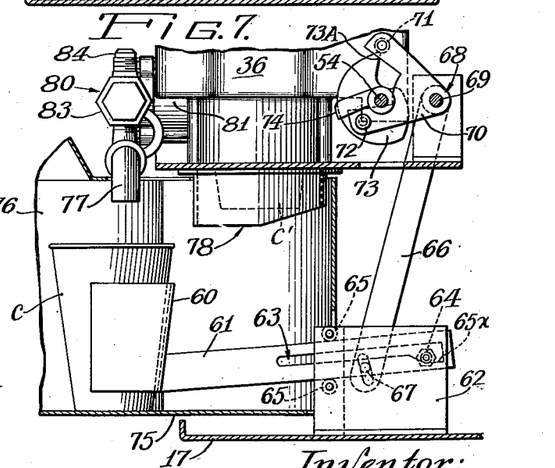
Fig. 7 is a view similar to Fig. 6 but showing the cup advanced to beverage-receiving position.
Figure 8:
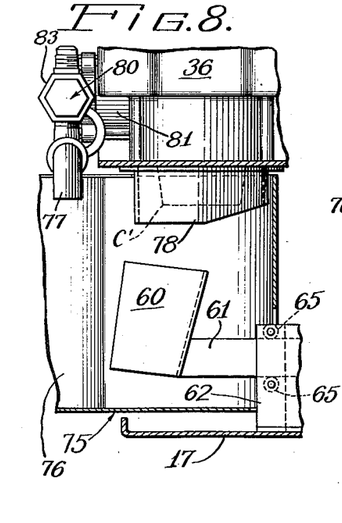
Fig. 8 is a view similar to Fig. 7 but showing the cup-engaging formation in normal or idle condition and blocking relation to the cup ejector.

As shown in Figs. 6 to 8, the throat 35 is of sufficient height to permit several cups, usually six, to remain in the cup ejector after the magazine is empty as a reserve pending movement of a full magazine into position.

Means controlling the automatic advance of the magazines, includes (Fig. 3 or 4) a sensitive switch 40 provided with an operating lever 41 having a feeler nose or offset 42 projecting through a slot 43 in the throat 35, Fig. 3, to engage the uppermost of the reserve supply of cups therein.

When the reserve supply of cups in the throat 35 drops below the feeler nose 43, switch lever 41, urged by the switch operating button 44, Fig. 4, pushes inwardly of the throat and the switch is closed, thereby energizing the magazine or conveyor motor 28, Figs. 9 and 10, by circuit connections to be described. In this manner, the lower conveyor chain (and hence the companion chain) is advanced to carry the next magazine into register with the throat 35, and as soon as the new supply of cups in said next magazine drops into the throat, the switch feeler 42 will thereby be pushed outwardly to open the switch and stop motor 28.

In the illustrative embodiment, the dispensing operation of the machine is coin-controlled. Referring to Fig. 1, the required coin is deposited in a gravity type coin testing chute 50 and, among other things, actuates a master switch 51, circuit connections for which are more fully described hereinafter, with the ultimate result that the dispensing motor 52, Figs. 1 and 3 becomes energized, thereby rotating the main dispensing shaft 54, Figs. 3 and 4, particularly, and as seen in the latter figure (see also the schematic showing of Fig. 11) this main shaft passes through the cup ejecter unit 36 to actuate the known ejecting mechanism thereof (not seen) and cause one paper cup to issue from the bottom thereof at a certain time relative to the cycle of rotation of said main shaft 54 so that the cup will be in proper position relative to the cup-positioning means now to be described.

As viewed in Fig. 7, the cup-positioning means includes a cup-engaging or holding means 60 in the nature of a semi-cylindrical guard tapering downwardly to correspond to the shape of the cup illustrated, which may be described as of frustro-conical contour in the particular that the cup is of lesser diameter near its bottom than at its top, and accordingly, the taper of the guard tends to make it narrower near its bottom edge than at its top, so that the paper cup, although of relatively slight weight, nevertheless tends to wedge itself into the holding guard as it drops from the ejector; and this wedging, while slight, is sufficient to assure the cup's remaining in engagement with the positioning means.

The cup holder or guard member 60 is attached to the end of a positioning arm 61, which is slidable between a pair of upright brackets 62, Fig. 3, on bottom plate 17, said arm being slotted longitudinally as at 63 to engage a guiding cam element 64 fixed near the rear or right-hand (Fig. 7) end of the brackets, while the forward or left-hand portion of said arm rides between rollers 65 on said brackets.

Means for reciprocating said positioning arm 61 includes a drive arm 66 pivotally connected, as at 67, to arm 61, and as at 68, Figs. 4 and 7, to a counter shaft 69. A controlled, complex motion is imparted to the cup-positioning means by reason of an especially contrived cam drive means shown in Figs. 4, 6, and 7, which means includes a yoke-shaped cam 70 provided with cam rollers 71 and 72 at the ends of the yoke arms, which rollers are engaged by a cam 73 fast on the main shaft 54.

As the main shaft rotates, cam 73 imparts the following peculiar motion to the cup guard and positioning arm: from the normal blocking position of Fig. 8, the cup holder or guard 60, which is at this time not directly in alignment below the cup ejector, is retracted to cup-receiving position as in Fig. 6, with the guard or holder element 60 slightly elevated and tilted backward, toward the right, to receive and hold the ejected cup C.

As soon as the cup is received, arm 61 starts forward, toward the left, and at the same time, the forward or guard end thereof is slightly lowered to bring the bottom of the cup close to and nearly level with the platform 75, Fig. 6 or 1, of the cup shield structure generally indicated at 76, the cup at this time being below the spigot 77, from which the beverage now begins to flow by reason of timed driving connection with the main drive shaft 54, as will be explained.

The cup positioning means continues to carry the filling cup forward to the left, and it is important to observe that since the cups are contemplated to be made of paper of relatively light weight, they become slightly deformed by the weight of beverage liquid therein and are even more firmly wedged into the guard or holder 60 than when initially received therein.

In order to assure the release and discharge of the filled cup C from the guard holder 60, the special cam means heretofore alluded to, causes the guard 60 to be dropped slightly at the end of the positioning stroke, there being an enlargement 65X, Figs. 6 and 7, in the positioning arm slot 63, which, when opposite the roller 64, permits arm 61 to lower its left-hand end for this purpose.

After the releasing movement, aforesaid, of the cup positioning means, the holder or guard 60 is retracted at once to the normal blocking position of Fig. 8, wherein the upper extremities of the guard as closest to the depending apron 78 of the cup ejector mechanism, by reason of which, cooperatively with the blocking function of the cup shield structure 76, access to the lowermost cup C' in the ejector is materially blocked to discourage vandalism and theft of cups, both being serious problems in unattended and coin-operated machines of this class.

The aforesaid complex-motion of the cup-positioning means is afforded by the especial shaping of the cam means 70, 71, 72, 73, and a return cam arm 74, also fast on the main shaft 54 to rotate with cam 73, the cam action being such that when the cup is in fully advanced position, cam arm 74 turning counterclockwise, Fig. 7, will engage the cam roller 72 and impart similar movement to countershaft 69 and arm 66, thereby retracting the guard arm 61, toward the right; and the guard portion 60 will be elevated toward blocking position of Fig. 8 by reason of the downward movement of the right-hand end of arm 61 as slot 63 is displaced toward the right and roller 64.

When, in this action, the return cam arm 74 has rotated the yoke cam roller 72 far enough counterclockwise to pass out of engagement with said roller, the cup guard will be in fully normal position, corresponding substantially with the end of the cycle of rotation of shaft 54.

At the beginning of said cycle, following deposit of a coin, for example, positioning cam 73 will rotate counterclockwise against roller 71 and effect a reverse motion, that is toward the left, of the guard arm 61, corresponding to a clockwise rotation of the cam yoke 70, such positioning or advancing motion of the yoke cam terminating when the point 73A of cam 73 disengages cam roller 71, as illustrated approximately in Fig. 7, which shows the cup substantially fully advanced, it being noted here that the cup continues in advancing motion while being filled, so that in Fig. 7 the stroke is not quite completed but is substantially so.

Means for dispensing the beverage liquid includes a combination flavoring syrup and carbonated water mixing unit generally indicated at 80, Figs. 3 and 4, which unit is of the general type disclosed in my copending application Serial No. 616,855, filed September 17, 1945, now Patent No. 2,532,118, issued Nov. 28, 1950.

Referring to Fig. 4, said mixing unit consists of a syrup pump 81, adapted to be connected to a syrup supply line (not shown) as by nipple 82, Fig. 3, and a water mixing valve 83, adapted for connection, as by nipple 84 (Fig. 3 also) to a supply line for carbonated water.

Figure 5:
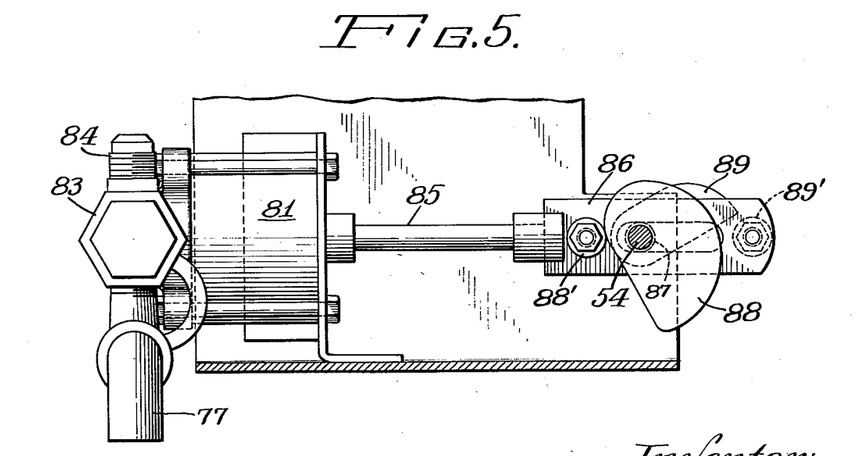
Fig. 5 is a fragmentary elevational detail, to enlarged scale of the beverage measuring and dispensing means and drive therefor, looking in the direction of lines 5—5 of Fig. 4.

As viewed in Figs. 4 and 5, the syrup pump has a piston rod 85 connecting with pitman 86 riding on roller 87 on main drive shaft 54, there being an advancing cam 88 and a return cam 89 fixed on said shaft on opposite sides of the pitman and respectively driving against rollers 88' and 89' on the pitman so as to reciprocate the pump piston 85 once per revolution of the main shaft 54, thereby causing the syrup pump to fill and discharge a measured volume of flavoring syrup or the like one for each revolution or operating cycle of the main shaft.

By special valve means, not shown herein, but fully disclosed in my aforesaid copending application, the ejection by said pump of the syrup into the water mixing valve portion 83 of the unit, causes valve means to open and admit (at 84) or pass carbonated water under pressure, which mixes with said syrup as the latter, and the water, issue from the spigot 77, Figs. 3, 5 and 7.

Figure 11:
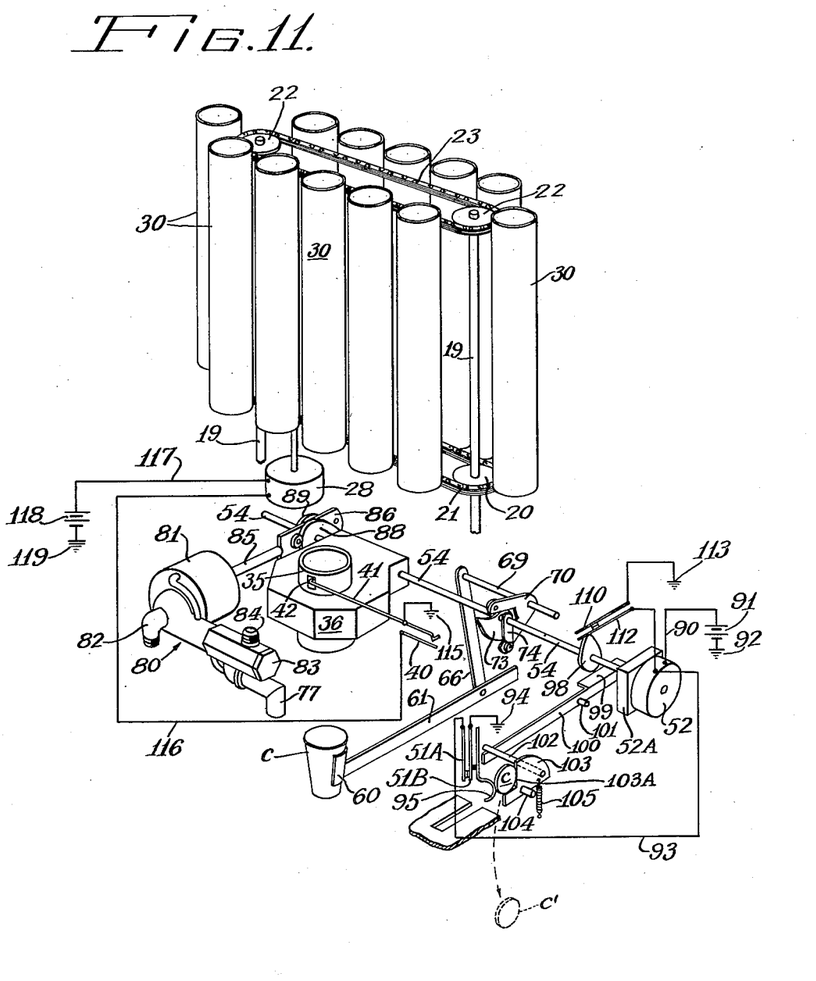
Fig. 11 is a skeletonized layout in perspective of the principal operating parts of the dispensing apparatus.

Another important features of the novel dispensing apparatus is illustrated best in the schematic view of Fig. 11, wherein the dispensing motor 52 is connected by conductor 90 to a source of electric power, for example battery 91 grounded at 92, and an initial starting circuit for the motor is provided via conductor 93 from the latter through coin switch contacts 51A, 51B to ground 94 when said contacts are closed as by the coin C', dropped into chute 50 and resting against operating spring 95 to hold said contacts closed so long as the coin rests opposite spring 95, the period of such resting of the coin being terminated after initial starting of the dispensing cycle of the apparatus, as will presently appear.

When the starting switch contacts 51A, 51B are coin-closed as aforesaid, motor 52 start a slow turning of the main shaft 54 through a self-contained speed reducing means 52A of known construction, and the dispensing cycle has begun, with a resultant actuation of the cup ejecting means 36, the cup-positioning means 60, 61, and the beverage dispensing means 80.

As an important incident to the initial rotation of the main shaft 54, as aforesaid, the coin C initially used to start the cycle and close contacts 51A, 51B, is removed from switch-operating or effective position by means including a control cam 98 on the main shaft 54, the rise portion of which bears down on the offset flat 99 of lever 100, pivoted at 101, with the result that the free end portion of this lever rises against pin 102 on a coin ejector 103, pivoted at 104, and normally urged clockwise by its spring 105, so that the coin C is pushed against and past the switch operating spring arm 95 and permitted to gravitate into a coin receptacle 106, Fig. 1.

As a further incident to the aforesaid initial rotation of the main shaft 54, and movement of the control cam 98, contact 110 of a master cycling switch 111, is permitted to close circuit with its companion contact 112, thereby completing an operating circuit for motor 52 from ground 113 to the motor, or in other terms, completing a supervisory or cycling shunt circuit around the starting switch 51, which will open one-half cycle after shaft 54 starts to turn, in order to clear the coin control of the starting coin for the purpose of preventing fraudulent operation of the machine, as by a captive coin, i. e. one with a string or wire attached to permit manipulation and holding of the coin against the starting switch. The coin control, cooperating with a shunt switch and the main actuating shaft of the machine, forcibly ejects the coin, by means of ejector 103, from the coin control means, and, moreover, prevents retraction of such a captive coin against the starting switch by reason of the blocking action of portion 103A of the ejector, in its normal, coin-receiving condition.

When the dispensing cycle is completed, control cam 98 will separate contacts 110, 112, stopping motor 52 until such time as another coin causes closure of starting contacts 51A, 51B, whereupon, the dispensing cycle will again be initiated.

When the last cups in throat 35 of cup ejector 36 drop below the level of the cup control or magazine switch operating feeler 42, the latter moves inwardly of the throat, as heretofore described, closing switch 40, Fig. 11, and thereby connecting operating ground 115 via conductor 116 to cup magazine motor 28, and completing an operating circuit from the latter through conductor 117 and power source or battery 118, grounded at 119.

Having thus described my invention, what I claim and desire to protect by Letters Patent of the United States is:

1. In a beverage dispenser, a cup shield, a dispensing spigot behind said shield, cup ejecting means adjacent said spigot, a cup holder reciprocable beneath said ejecting means and spigot and toward an opening through said shield, means for actuating said cup holder and ejecting means in timed correlation to discharge of beverage from said spigot, said last-mentioned actuating means including a reciprocating arm for said cup holder, drive means for reciprocating said arm, and means acting upon said arm during reciprocal motion thereof for effecting movements thereof in a sense lateral to the reciprocating motion thereof, such that in a normal position of rest said holder is elevated to a guard position blocking access to said cup ejecting means through said shield opening, said holder being lowered prior to ejection of a cup in position to receive said cup, said holder further advancing toward said shield opening and travelling the cup held thereby beneath said spigot, said holder being moved in a lateral sense for disengagement from the advanced cup, and being restored to guard position as aforesaid.

2. In a beverage dispenser, in combination, a beverage spigot, a cup ejector having an exit opening for cups, a shield portion having an access opening for seizure of filled cups, means actuating the ejector in timed relation to discharge of beverage from said spigot, and cup positioning means including a cup holder mounted for movement toward and away from said access opening beneath said spigot and the exit portion of said ejector, together with mechanism moving said cup holder in timed coaction with cup ejecting actuation of the ejector in a plurality of movements constituting an operating cycle corresponding to each ejecting actuation of the ejector, said movements including movement of said holder from normal guarding position to receiving position beneath said exit to receive a cup therefrom, advance of the cup beneath said spigot toward said access opening, rocking of said holder to lessen its holding engagement with a cup carried thereby, and restoration of said holder to said normal guarding position with the holder disposed in a blocking sense between said exit of the cup ejector and said access opening of the shield portion.

3. In dispensing apparatus of the class described, the combination of a cup dispenser and cup position means including a cup holder formed to the contour of side portion of a cup to be dispensed such that a cup will lie slightly wedged therein when the holder is in a cup receiving position, said cup being adapted to become further wedged when filled with beverage, means for moving said holder relative to said cup dispenser and a beverage source, and means for moving said holder when the cup carried thereby is filled with beverage to substantially release the wedging engagement between the cup and holder.

4. In a beverage dispenser for filling paper cups having curvilinear side portions, the combination with a cup dispenser for cups of the class characterized, of cup holding and advancing means including a holder having a curvilinear concavity into which a said cup fits to be held upon discharge therein from said dispenser, the paper wall and side portions of a cup carrying beverage expanding to wedge said cup in the holder, and means for moving said holder relative to said dispenser to receive a cup to be filled with beverage, and for further moving the cup and contents to a desired position and tilting said holder to substantially destroy any wedging between the cup and the holder.

5. A beverage dispensing apparatus as claimed in claim 3 including means for dispensing a beverage, means for operating said beverage dispensing means including a main dispensing shaft, said cup holder moving means connected to said shaft for operation thereby whereby a cup will be moved into beverage receiving position upon dispensing of a beverage and the dispensing of beverage will be discontinued before movement of the holder to release a filled cup.

6. In a beverage dispensing apparatus, the combination of a cup dispenser and cup position means including a cup holder formed to the contour of a side portion of a cup to be dispensed such that a cup will lie slightly wedged therein when the holder is in a cup receiving position, said cup being adapted to become further wedged when filled with beverage, means for moving said holder relative to said cup dispenser and a beverage source, means for dispensing a beverage, means for operating said beverage dispenser means including a main dispensing shaft, said holder moving means including a cam on said main dispensing shaft for moving said cup holder to position a cup in beverage receiving position, and a second cam on said shaft operable after discontinuance of cyclic operation of said beverage dispensing means for moving said holder when the cup carried thereby is filled with beverage to substantially release the wedging engagement between the cup and holder.

7. In a beverage dispenser for filling paper cups having curvilinear side portions, the combination with a cup dispenser for cups of the class characterized, of cup holding and advancing means including a holder having a curvilinear concavity into which said cup fits to be held upon discharge therein from said dispenser, the paper wall and side portions of a cup carrying beverage expanding to wedge said cup in said holder, a positioning arm attached to said holder, a cam guide on said positioning arm, a fixed cam engaging said cam guide, a driver arm connected to said positioning arm, and means for moving said drive arm to move said holder relative to said dispenser to receive a cup to be filled with beverage, and for further moving the cup and contents to a desired position and tilting said holder to substantially destroy any wedging action between the cup and holder.

8. In a beverage dispenser for filling paper cups having curvilinear side portions, the combination with a cup dispenser for cups of the class characterized, of cup holding and advancing means including a holder having a curvilinear concavity into which said cup fits to be held upon discharge therein from said dispenser, the paper wall and side portions of a cup carrying beverage expanding to wedge said cup in said holder, a positioning arm attached to said holder, a cam guide on said positioning arm, a fixed cam engaging said cam guide, a driver arm connected to said positioning arm, a main dispensing shaft, means for operating said shaft, a cam on said dispensing shaft for moving said driver arm to move said holder relative to said dispenser to receive a cup to be filled with beverage, and for further moving the cup and contents to a desired position and tilting said holder to substantially destroy any wedging action between the cup and holder.

9. In a beverage dispenser for filling paper cups having curvilinear side portions, the combination with a cup dispenser for cups of the class characterized, of cup holding and advancing means including a holder having a curvilinear concavity into which said cup fits to be held upon discharge therein from said dispenser, the paper wall and side portions of a cup carrying beverage expanding to wedge said cup in said holder, a positioning arm attached to said holder, a cam guide on said positioning arm, a fixed cam engaging said cam guide, a driver arm connected to said positioning arm, a main dispensing shaft, means for operating said shaft, a cam on said dispensing shaft for moving said driver arm to move said holder relative to said dispenser to receive a cup to be filled with beverage, and for further moving the cup and contents to a desired position and tilting said holder to substantially destroy any wedging action between the cup and holder, and a second cam on said main dispensing shaft operable after release of a filled cup by said holder to reverse the direction of movement of said driver arm and return said holder to a cup receiving position.

10. In a beverage dispenser for filling paper cups having curvilinear side portions, the combination with a cup dispenser for cups of the class characterized, means for dispensing a beverage, means for operating said beverage dispensing means including a main dispensing shaft, cup holding and advancing means including a holder having a cavity into which said cup fits to be held on discharge therein from said dispenser, the paper wall and side portions of a cup filled with beverage expanding to wedge said cup in said holder, a positioning arm attached to said holder, a cam guide on said positioning arm, a fixed cam engaging said cam guide, a driver arm connected to said positioning arm, and means for moving said driver arm for moving said holder relative to said dispenser to receive a cup to be filled with beverage, and further moving the cup and contents to substantially destroy any wedging action between the cup and holder.

11. In a beverage dispenser for filling paper cups having curvilinear side portions, the combination with a cup dispenser for cups of the class characterized, means for dispensing a beverage, means for operating said beverage dispensing means including a main dispensing shaft, cup holding and advancing means including a holder having a cavity into which said cup fits to be held on discharge therein from said dispenser, the paper wall and side portions of a cup filled with beverage expanding to wedge said cup in said holder, a positioning arm attached to said holder, a cam guide on said positioning arm, a fixed cam engaging said cam guide, a driver arm connected to said positioning arm, means for moving said driver arm for moving said holder relative to said dispenser to receive a cup to be filled with beverage, and further moving the cup and contents to substantially destroy any wedging action between the cup and holder, and a cam on said main dispensing shaft operable after release of a filled cup by said holder to reverse the direction of movement of said driver arm and return said holder to a cup receiving position.

12. Dispensing apparatus comprising a cyclically operable liquid dispenser, a cyclically operable cup dispenser, a cyclically operable cup magazine, a reciprocable cup positioning means receiving a cup from said cup dispenser and advancing said cup to and beyond a position of alignment with said liquid dispenser to be filled from the latter, a main power shaft and motor means therefor rotating said shaft through one complete dispensing cycle for each dispensing operation thereof, means controlling said motor means to start and stop the same in dispensing operations as aforesaid, and means driving said liquid dispenser, said cup dispenser, and said cup positioning means in cyclic dispensing operations and aligning operations, respectively as aforesaid, and means controlled by cups in said cup dispenser for effecting step by step cyclic advance of said cup magazine for discharging cups into the cup dispenser when there are less than a predetermined number of cups in the latter.

RALPH A. NICHOLSON.

REFERENCES CITED

The following references are of record in the file of this patent:

UNITED STATES PATENTS

| Number | Name | Date |
| --- | --- | --- |
| 1,882,812 | Gunn | Oct. 18, 1932 |
| 1,911,151 | Halsted et al. | May 23, 1933 |
| 2,019,016 | McLellaw | Oct. 29, 1935 |
| 2,055,214 | Christianson | Sept. 22, 1935 |
| 2,284,880 | Nicholson | June 2, 1942 |
| 2,352,858 | Nicholson | July 4, 1944 |
| 2,370,276 | Warren | Feb. 12, 1945 |
| 2,374,168 | Bowman | Apr. 24, 1945 |